United States Patent
Linn

(10) Patent No.: US 7,099,773 B2
(45) Date of Patent: *Aug. 29, 2006

(54) NAVIGATION SYSTEM ALLOWING TO REMOVE SELECTED ITEMS FROM ROUTE FOR RECALCULATING NEW ROUTE TO DESTINATION

(75) Inventor: Jian-Liang Linn, Rowland Heights, CA (US)

(73) Assignee: Alpine Electronics, Inc, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/704,397

(22) Filed: Nov. 6, 2003

(65) Prior Publication Data

US 2005/0102102 A1 May 12, 2005

(51) Int. Cl.
*G01C 21/30* (2006.01)
(52) U.S. Cl. .................................................. 701/210
(58) Field of Classification Search ........ 701/118–119, 701/200–201, 206–210, 213; 340/988, 990, 340/995; 345/824
See application file for complete search history.

(56) References Cited

U.S. PATENT DOCUMENTS 5,878,368 A * 3/1999 DeGraaf ..................... 701/209

| 2002/0040270 A1 | 4/2002 | Kwak et al. |
| 2002/0105549 A1* | 8/2002 | Yokota ........................ 345/824 |
| 2004/0150534 A1* | 8/2004 | Linn ....................... 340/995.13 |
| 2004/0204845 A1* | 10/2004 | Wong .......................... 701/210 |

FOREIGN PATENT DOCUMENTS

| JP | 2000-337899 | * 12/2000 |
| JP | 2002-090167 | * 3/2002 |

* cited by examiner

*Primary Examiner*—Thu V. Nguyen
(74) *Attorney, Agent, or Firm*—Muramatsu & Associates

(57) ABSTRACT

A method for navigation system modifies a route to the destination by allowing a user to select a type of items or conditions to be avoided from the route. The method includes the steps of displaying a set of data indicating items that a user will encounter when the user follows the calculated route, prompting the user to select a type of the item to be avoided in a new route to the destination, and recalculating the new route according to the user's selection and guiding the user to the destination through the new route. The navigation system displays the set of items which is classified into distance ranges each representing a range of distance from a current user position where each item is represented by a corresponding icon.

12 Claims, 18 Drawing Sheets

Fig. 4A
| Traffic Incident List | |
|---|---|
| Avoid All Incidents | Avoid Selected Incidents |
| 🚗 I-10 West Bound, Traffic Jam | |
| 🚗 I-605 South Bound, Congestion | |
| 🚗 CA-91 West Bound, Slow Traffic | |
| 🚧 CA-91 West Bound, before I-710 Construction | |
| 🚗 I-405 North Bound, Accidents | |
| 🚗 I-405 North Bound, Stall Big Rig | |
(87)
Fig. 4B
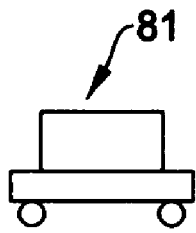 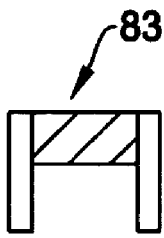 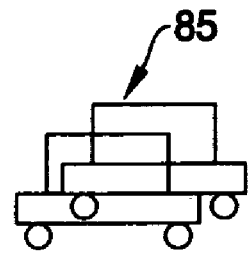
81     83     85

Fig. 6A

| CONFIRM ROUTE |
| --- |
| DEL AMO<br>3525 W. Carson St.<br>Torrance, CA<br>(310) 456-7890 |
| By Quickest Route Method |
| OK to Proceed |
| Options |
| Verify Trip Itinerary |

Fig. 6B

VP  NP
1/8mi
CALCULATING

Fig. 6C

NEXT TURN: ↰   Select List
0.8 MI  PRAIRIE AVE.

VP  NP
1/8mi

TO   16 MI   0:15 TO GO
ON: W. 190TH ST., TORRANCE

Fig. 6D

| Select Type |
| --- |
| Traffic Incident Type |
| Maneuver Type |
| POI Along the Route |
| POI Along the Route by Exit |
| Cancel |

Fig. 6E
| Maneuver Type List | | | OK |
|---|---|---|---|
| 0 - 5 mi | ⬛ | ↱ | ↗ |
| 5 - 10 mi | ↗ | → | ↴ |
| 10 - 15 mi | → | ↴ | ↗ |
| 15 - 20 mi | ↱ | ↙ | ↰ |
| 20 - 25 mi | ↴ | ↗ | ↗ |
Fig. 6F
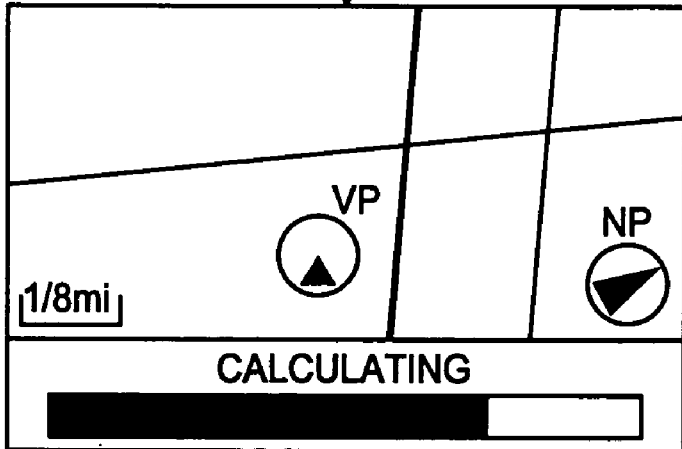
Fig. 6G
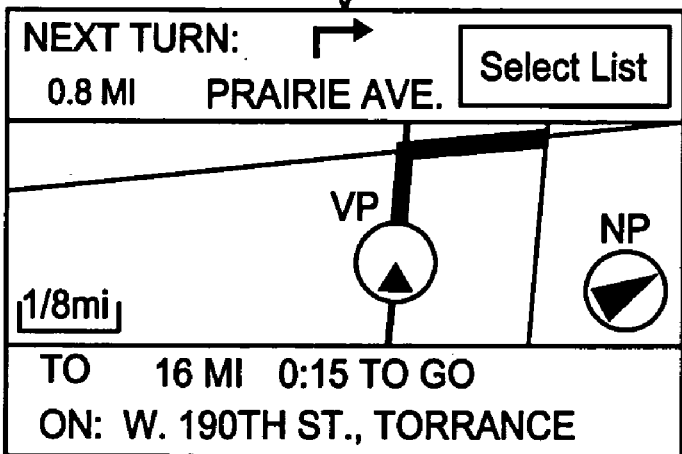

Fig. 9

Traffic Type List

| | | | | | | OK |
|---|---|---|---|---|---|---|
| 0 - 5 mi | 🚗 | 🚧 | 🚗 | 🚗🚗(85) | LANE CLOSED | |
| 5 - 10 mi | 🚧 | 🚗 | 🚗 | | | |
| 10 - 15 mi | 🚗 | 🚗🚗 | | | | |
| 15 - 20 mi | 🚗🚗 | 🚧 | | DETOUR | 🚗 | |
| 20 - 25 mi | 🚗 | 🚧 | | | | |

Fig. 11

Maneuver Type List

| 0 - 5 mi | ↑ | ↱ | ↖ | |
| 5 - 10 mi | ↖ | ↑ | ↱ | |
| 10 - 15 mi | ↑ | ↱ | ↖ | |
| 15 - 20 mi | ↑ | ↙ | ↓ | |
| 20 - 25 mi | ↱ | ↖ | ↖ | OK |

Fig. 13

Maneuver Type List

| 0 - 5 mi | ↑ | ↱ | ↗ | | OK |
| --- | --- | --- | --- | --- | --- |
| 5 - 10 mi | ↗ | ↑ | ↱ | | |
| 10 - 15 mi | ↱ | ↗ | | | |
| 15 - 20 mi | ↱ | ↙ | ↓ | | |
| 20 - 25 mi | ↱ | ↗ | ↗ | | |

Fig. 14

POI Along the Route List

| | | | | | | OK |
|---|---|---|---|---|---|---|
| 0 - 5 mi | Food | Gas | | Rest Area | Shopping | |
| 5 - 10 mi | Food | Gas | | | | |
| 10 - 15 mi | Gas | Rest Area | Food | | | |
| 15 - 20 mi | Rest Area | Food | Gas | | | |
| 20 - 25 mi | Food | Gas | Shopping | | | |

Fig. 15

POI Along the Route List

| | | | | OK |
|---|---|---|---|---|
| 0 - 5 mi | Food | Gas | | Rest Area (97) / Shopping (98) |
| 5 - 10 mi | Food | Gas | | |
| 10 - 15 mi | Gas | Rest Area | | |
| 15 - 20 mi | Rest Area | Food | Food | |
| 20 - 25 mi | Food | Gas | Shopping | |

Fig. 16

| | | | POI Along the Route List | | OK |
|---|---|---|---|---|---|
| 0 - 5 mi | Food | Gas | | | |
| 5 - 10 mi | Food | Gas | | | |
| 10 - 15 mi | Gas | Rest Area | Food | | |
| 15 - 20 mi | Rest Area | Food | Gas | | |
| 20 - 25 mi | Food | Gas | Shopping | | |

Fig. 17

POI Along the Route List

| Exit | | | OK |
|---|---|---|---|
| Exit 1A | Food | Gas | |
| Exit 2 | Food | Gas | |
| Exit 3B | Gas | Rest Area | Food |
| Exit 5 | Rest Area | Food | Gas |
| Exit 18 | Food | Gas | Shopping |

NAVIGATION SYSTEM ALLOWING TO REMOVE SELECTED ITEMS FROM ROUTE FOR RECALCULATING NEW ROUTE TO DESTINATION

FIELD OF THE INVENTION

This invention relates to a navigation system that allows a user to avoid or omit certain types of traffic data such as a maneuver type, traffic incident type, and point of interest type in order to accommodate the needs of the user in obtaining a calculated route to the destination. More specifically, this invention relates to a navigation system that allows the user to freely choose settings for retrieving data or recalculate the route to the destination when the user selects a particular type of maneuver, traffic incident, or points of interest to be avoided from the route.

BACKGROUND OF THE INVENTION

Modern vehicles are equipped with sophisticated electronic devices such as multimedia entertainment systems, GPS navigation systems, Internet access devices, and the like. This invention is directed to a display method and apparatus for navigation system for guiding the user to the destination and for displaying traffic information which is typically implemented in such a vehicle electronic device, although the present invention is not limited to the automobile use. This invention can also be applied to a hand-held navigation system, remote terminal, PDA (personal digital assistant), etc. However, for the convenience of explanation, the present invention will be described with respect to a vehicle navigation system.

When driving an automobile, a user wants to reach the destination quickly and smoothly. A user uses the route calculation function of the navigation system to obtain the effective route to a particular destination. In this function, the processor provided in the navigation system calculates an optimum route to the destination. However, because of various traffic incidents, such as traffic jams, accidents, construction, etc., it is sometimes difficult to enjoy smooth driving to the destination. Thus, when driving an automobile to the destination guided by a vehicle navigation system, a user wants to know whether there are any traffic incidents that may affect his/her travel to the destination.

Today, there is a radio communication service which provides traffic information to subscribed members through a wireless transmission or a telephone network. If a user is a member of such a service, he is able to receive the ongoing traffic information through the vehicle navigation system, a portable navigation device, or the like, having a radio transmitter or an Internet access capability. For example, such traffic information (typically depicted by traffic incident icons) will be combined with a map image of an area where the user is currently located.

The traffic conditions can be classified into several categories. For example, the condition is conceivable wherein one vehicle or more vehicles stalled on the middle or proximate with the calculated route for any reason. Another condition is that two or more vehicles collide on or proximate to the calculated route. Still another condition is where traffic construction is in progress while automobile accidents are not involved. Still another condition is that the traffic is extremely slow even though no accident or construction exists but only because there are too many vehicles on the road at the same time. There may be still other conceivable traffic condition types.

Such types of traffic condition are relevant when the user wants to determine which route to take to reach the destination. Each traffic type can pose different consideration in determining the specific route to the destination. For example, the user may reason that the problem associated with a stalled vehicle can be quickly eliminated while the problem due to a road construction may be long-lasting. If the user makes such determination, the user may decide to ignore the stalled vehicle in evaluating the route to the destination but try to avoid the road construction.

Traffic maneuvers can pose similar problems as well. Traffic maneuvers refer to the operation of the vehicle in turning or stopping, etc. When the user wants to avoid making a left turn since the user is uncomfortable with the move, the user may want to make an alternative route that does not involve or decreases the instances of left turns. Still another situation where the user wants to avoid a specific maneuver is when the user knows that making the particular maneuver will lead to an undesirable area or condition. For instance, the user may know that by making a right turn at a particular intersection, he will get into a bumpy road. Even if the bumpy route requires less travel time to the destination, the user may want to avoid damages to his vehicle or discomfort in driving. Thus, the user may want to change the route to avoid the bumpy road.

The user may also wish to eliminate a certain category of point of interest ("POI") from a POI list so as not to display the particular category of POIs. The navigation system is capable of listing various types of POIs along the route. However, because there are many types (categories and sub-categories) of POI, the navigation system displays a long list of POIs, which may become difficult for the user to find the desired POI data. Such a long list of POIs can be distracting to select a desired POI type from many entries of POI in the list, the user may wish to limit POI type to be displayed on a screen. For example, the user may want to know only about gas stations along the route. In that case, he may wish to eliminate such types of POIs as food or shopping area, or the like, from the POI list.

As described above, the user desires to use his discretion in determining which route to take or not to take by limiting or avoiding particular traffic incidents or traffic maneuvers. The user may also wish to eliminate certain POI types to obtain a tidy view on a display. The process of limiting or avoiding particular traffic conditions and maneuvers and POI types must be performed with minimum distraction to the user so that the user can concentrate on driving. The process must also allow the user to specify the conditions to a reasonable detail at a glance. Thus, there is a substantial need for a navigation system that allows the user to easily limit or avoid particular traffic conditions and maneuvers.

SUMMARY OF THE INVENTION

It is, therefore, an object of the present invention to provide a navigation system that is capable of modifying a calculated route by prompting the user to select a type of traffic or POI item to be avoided in a modified route.

It is another object of the present invention to provide a navigation system that is capable of modifying a calculated route in which the navigation system displays traffic data such as traffic incidents or traffic maneuvers on which the user is able to select the traffic data to remove the incident from the route.

It is still other object of the present invention to provide a navigation system that is capable of modifying a calculated route in which the navigation system displays traffic incident information, traffic maneuver information, or POI information to be avoided that are arranged in the order of distance range from the user position.

It is still another object of the present invention to provide navigation system that is capable of eliminating a category of points of interest by selecting among the categories arranged in the order of distance range from the current user position.

It is still another object of the present invention to provide navigation system that is capable of eliminating a category of points of interest by selecting among the categories arranged per exits of the street aligned in the order of distance from the current user position.

One aspect of the present invention is a method for a navigation system to modify a calculated route to a destination. The method is comprised of the steps of: displaying a set of items that a user will encounter when the user follows the calculated route; prompting the user to select a type of the items to be avoided in a new route to the destination; and recalculating the new route according to the user's selection and guiding the user to the destination through the new route.

In conducting the method, the navigation system displays the set of items which is classified into distance ranges each representing a range of distance from a current user position. The items within the corresponding distance range are displayed in the order of distance from the current position of the user. The navigation system creates the new route by calculating a portion of the route corresponding to the distance range that has contained the item selected by the user, or alternatively, by recalculating the whole route including the distance range that has contained the item selected by the user.

In the method of the present invention, the types of items displayed are traffic incidents along the calculated route. In this situation, the method is further comprised of the steps of: receiving traffic incident information through a wireless communication; relating the traffic incident information with locations along the route to the destination; and displaying symbols representing the traffic incidents, thereby prompting the user to select the type of item to be avoided from the route. In another example, the items from which the user makes the selection are traffic maneuvers including directions of turn at intersections.

Another aspect of the present invention is a method for a navigation system to modify a list of points of interest along a calculated route to a destination. The method is comprised of the steps of: displaying categories of points of interest that a user will encounter when the user follows the calculated route; prompting the user to select a category of points of interest to be removed from the display; and removing the category of points of interest selected by the user from the display.

In carrying out the method of the present invention, the navigation system displays the categories of points of interest which are classified into distance ranges each representing a range of distance from a current user position. In another example, the navigation system displays the categories of points of interest which are classified into exits of a street included in the calculated route to the destination. The exits are displayed in the order of distance that the user will encounter when the user follows the calculated route.

A further aspect of the present invention is a navigation system for implementing the steps defined in the display method of the present invention noted above. The navigation system includes various means to allow the user to freely choose settings for retrieving data or recalculate the route to the destination when the user selects a particular type of maneuver, traffic incident, or points of interest to be avoided from the route.

According to the present invention, the navigation system is capable of modifying the route to the selected destination quickly and efficiently by allowing the user to pick an undesirable traffic incident, traffic maneuver, or the like. Because the recalculation after the selection of the traffic incident or maneuver requires only the recalculation in a certain range, the time and the load on the processor can be minimized. Further, the user can eliminate an unwanted category of points of interest (POIs) that will be encountered in following the calculated route to simplify the information on the screen. Because the information with regard to the traffic information, traffic maneuver, and points of interests are arranged by the separate rows representing distances on the route or exits of a particular street, the user can easily select a desired object.

BRIEF DESCRIPTION OF THE DRAWINGS

FIG. 4A is an example of display of the navigation system showing information on types and nature of traffic incidents acquired by wireless transmission, and FIG. 4B shows examples of icons used to represent the traffic incident types displayed on the navigation system.

FIGS. 6A–6G are schematic diagrams showing an example of process and display examples on the screen of the navigation system of the present invention for selecting a destination, selecting items to be removed, and modifying the route according to the user's selection.

FIG. 9 is an example of display on the screen of the navigation system of the present invention corresponding to the traffic incident type list of FIG. 8 where a collision type incident in the 0–5 mile range is selected.

FIG. 11 is an example of display on the screen of the navigation system of the present invention showing a maneuver type list arranged by the order of distance from the present user position.

FIG. 13 is an example of display on the screen of the navigation system of the present invention in which the right turn maneuver selected in FIG. 12 is eliminated from the 0–5 mile rage in the list.

FIG. 14 is an example of display on the screen of the navigation system of the present invention showing a list of points of interest (POI) arranged by the order of distance from the present user position.

FIG. 15 is an example of display on the screen of the navigation system of the present invention corresponding to the traffic incident type list of FIG. 14 where POI types of "Rest Area" and "Shopping" in the 0–5 mile range are selected.

FIG. 16 is an example of display on the screen of the navigation system of the present invention in which the POI types of "Rest Area" and "Shopping" selected in FIG. 15 are eliminated from the 0–5 mile rage in the list.

FIG. 17 is an example of display on the screen of the navigation system of the present invention showing POIs along the route to the destination in which the POIs are arranged per each exit of freeway on the route.

DETAILED DESCRIPTION OF THE INVENTION

The navigation system of the present invention will be described in more detail with reference to the accompanied drawings. While the present invention will be described in conjunction with the vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

The navigation system implementing the present invention allows the user to avoid or eliminate certain conditions and recalculates a route to the destination. The navigation system allows the user to avoid certain types of traffic incident or traffic maneuver by selecting the traffic incident or traffic maneuver from the list. Similarly, the navigation system allows the user to avoid certain types of point of interest (POI). In order to describe the present invention, brief explanations will be made for the navigation system that receives traffic information through wireless communication.

Figure 1A:
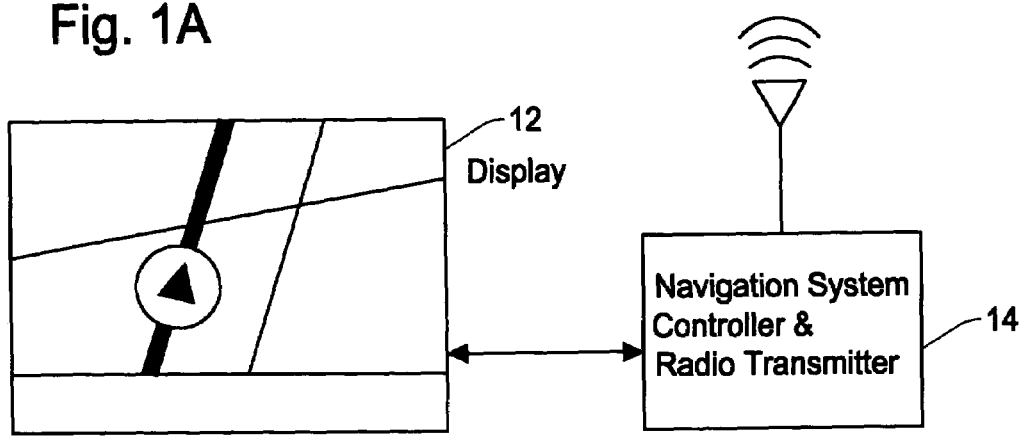
FIGS. 1A and 1B are schematic diagrams showing examples of basic configuration of a navigation system with a radio communication for receiving traffic information in accordance with the present invention.
Figure 1B:
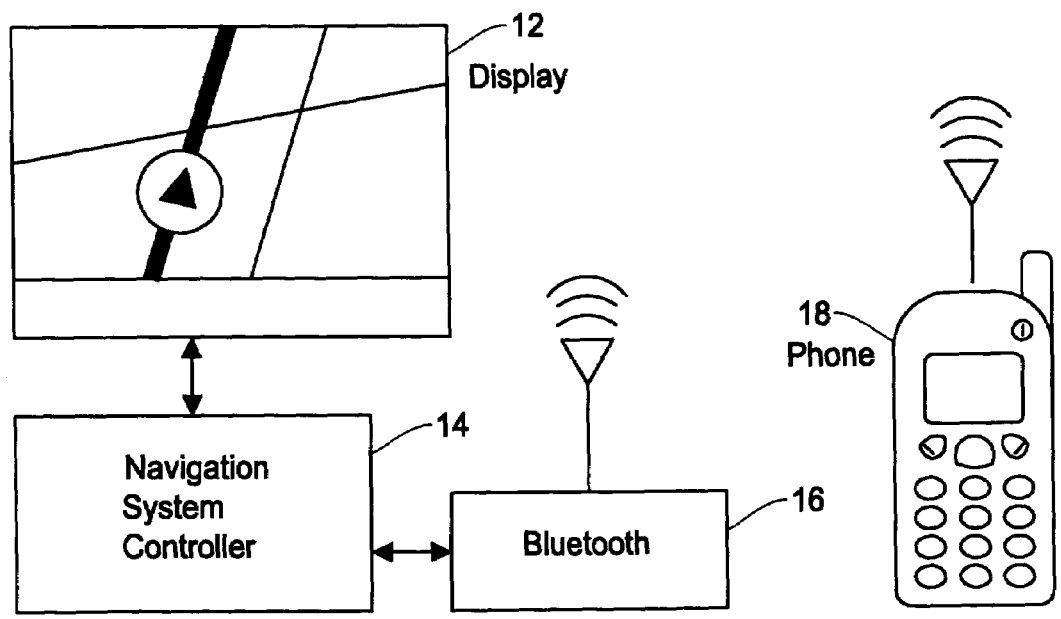

FIG. 1A and 1B schematically show a basic structure of the navigation system that implements a wireless transmission device for communication with a database server and a controller for processing the traffic information. Typically, the navigation system is a vehicle navigation system installed in a vehicle. An example of radio communication device includes a satellite radio transmitter, FM sub-carrier transmitter, a cellular phone, a Bluetooth transceiver or other radio communication method as an embedded or peripheral device.

FIG. 1A is an example of navigation system having a radio transmitter. The example of FIG. 1A shows a display 12 of the navigation system and a navigation system controller 14 with a radio transmitter. The radio transmitter receives various types of information from remote database servers (service providers) through wireless communication.

FIG. 1B is an example of navigation system which incorporates a short distance radio transmitter such as a Bluetooth transceiver and a Bluetooth compatible cellular phone. The navigation system is formed of a display 12 of the navigation system, a navigation system controller 14, a short distance transmitter 16, and a cellular phone 18. An example of short distance transmitter 16 includes a Bluetooth transmitter (transceiver), an IEEE 802.11b wireless LAN transmitter, and a HomeRF transmitter. The short distance wireless transmitter 16 is connected to the navigation system and communicates with the cellular phone 18 to establish long distance radio communication. The cellular phone 18 is designed to be compatible with the Bluetooth or other radio communication protocol noted above.

Figure 2:
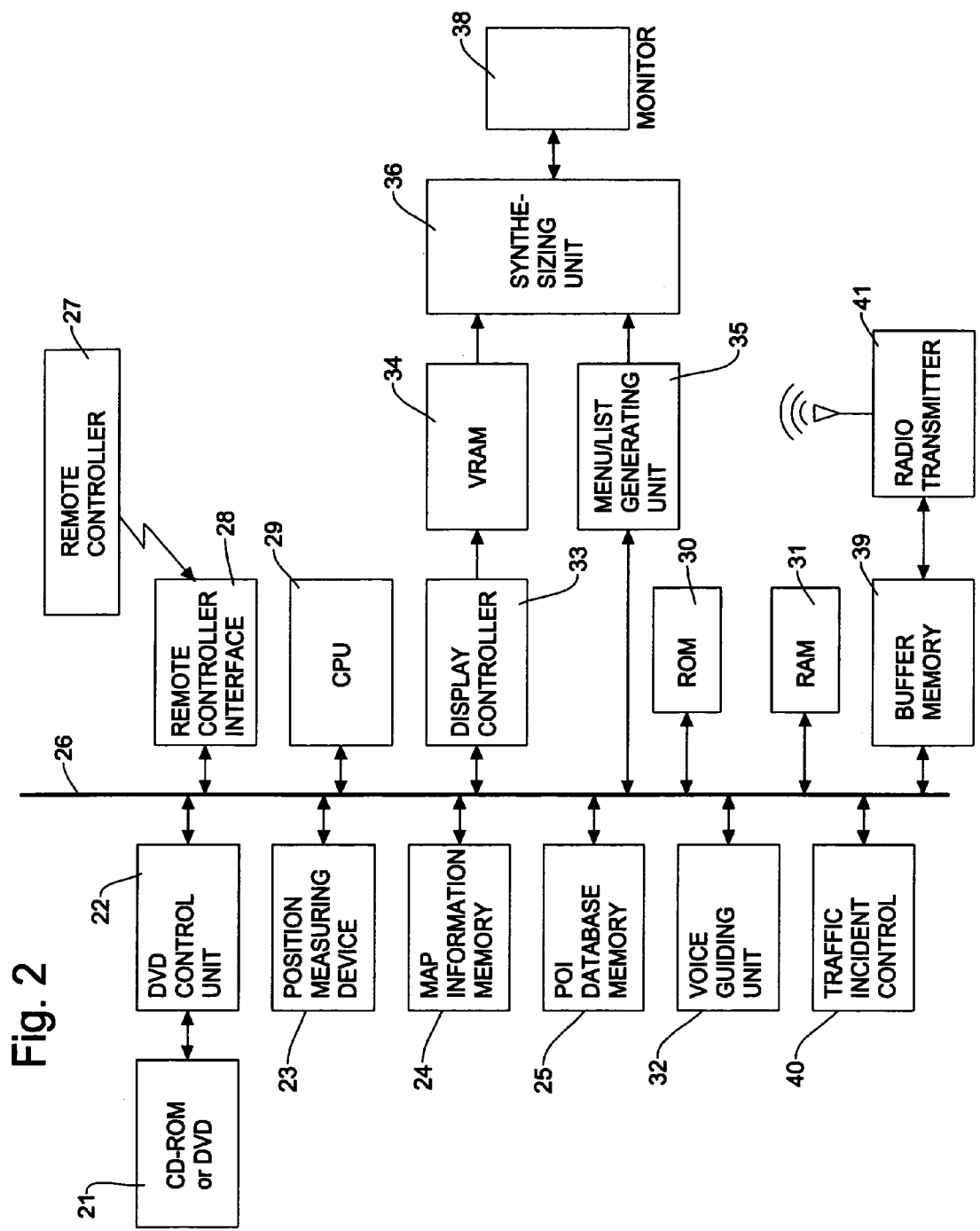
FIG. 2 is a block diagram showing an example of structure in the vehicle navigation system for implementing the present invention.

FIG. 2 shows an example of structure of a vehicle navigation system implementing the present invention. It should be noted that the present invention can also be applied to a portable navigation device such as a one implemented by a PDA (personal digital assistant) device or other hand-held devices. In the block diagram of FIG. 2, the navigation system includes a map storage medium 21 such as a CD-ROM, DVD, hard disc or the like (hereafter "DVD") for storing map information, a DVD control unit 22 for a controlling an operation for reading the map information from the DVD, a position measuring device 23 for measuring the present vehicle position. The position measuring device 23 includes a vehicle speed sensor for detecting a moving distance, a gyro for detecting a moving direction, a microprocessor for calculating a position, a GPS receiver, and etc.

The block diagram of FIG. 2 further includes a map information memory 24 for storing the map information which is retrieved from the DVD 21, a database memory 25 for storing database information such as point of interest (POI) information which is read out from the DVD 21, a remote controller 27 for executing a menu selection operation, an enlarge/reduce operation, a destination input operation, etc. and a remote controller interface 28.

Although a remote controller 27 is a typical example for selecting menus, executing selected functions and etc., the navigation system includes various other input methods to achieve the same and similar operations done through the remote controller. For example, the navigation system includes hard keys and a joy stick on a head unit of the navigation system mounted on a dash board, touch screen of the display panel, and voice communication means.

In FIG. 2, the navigation system further includes a bus 26 for interfacing the above units in the system, a processor (CPU) 29 for controlling an overall operation of the navigation system, a ROM 30 for storing various control programs such as a route search program and a map matching program necessary for navigation control, a RAM 31 for storing a processing result such as a guide route, a voice interface and guiding unit 32 for voice communication interface and spoken instructions, a display controller 33 for generating map image (a map guide image and an arrow guide image) on the basis of the map information, a VRAM (video RAM) 34 for storing images generated by the display controller, a menu/list generating unit 35 for generating menu image/various list images, a synthesizing unit 35, a buffer memory 39 for temporarily storing data such as traffic data and icon data associated with traffic incidents, a traffic incident and POI display control unit 40 for controlling a traffic incident or POI display operation in accordance with the present invention, and a radio transmitter 41 for wireless communication with a remote traffic information server.

The traffic incident and POI display control unit (hereafter "display control unit") 40 plays a major role in the present invention. The display control unit 40 checks the map data retrieved from the map data storage 21 when the requested data is a list of POIs (points of interest). The display control unit 40 checks the traffic information from the remote traffic data server through the radio transmitter 41. Preferably, the buffer memory 39 stores data representing icons symbolizing the traffic incidents.

Thus, when the user requests the traffic incident information, the display control unit 40 arranges the traffic incident data along the calculated route to the destination for each distance range from the current user position. When the user requests the POI information, the display control unit 40 arranges the POI data along the calculated route to the destination for each distance range from the current user position or for each exit of a street. The user can select one or more items on the display to remove from the route to the destination. The display control unit 40 sends signal to CPU 29 to recalculate the route in which the item specified by the user is removed. The display control unit 40 controls the monitor 38 to display the traffic incident data or POI data classified into distance ranges.

Figure 3:
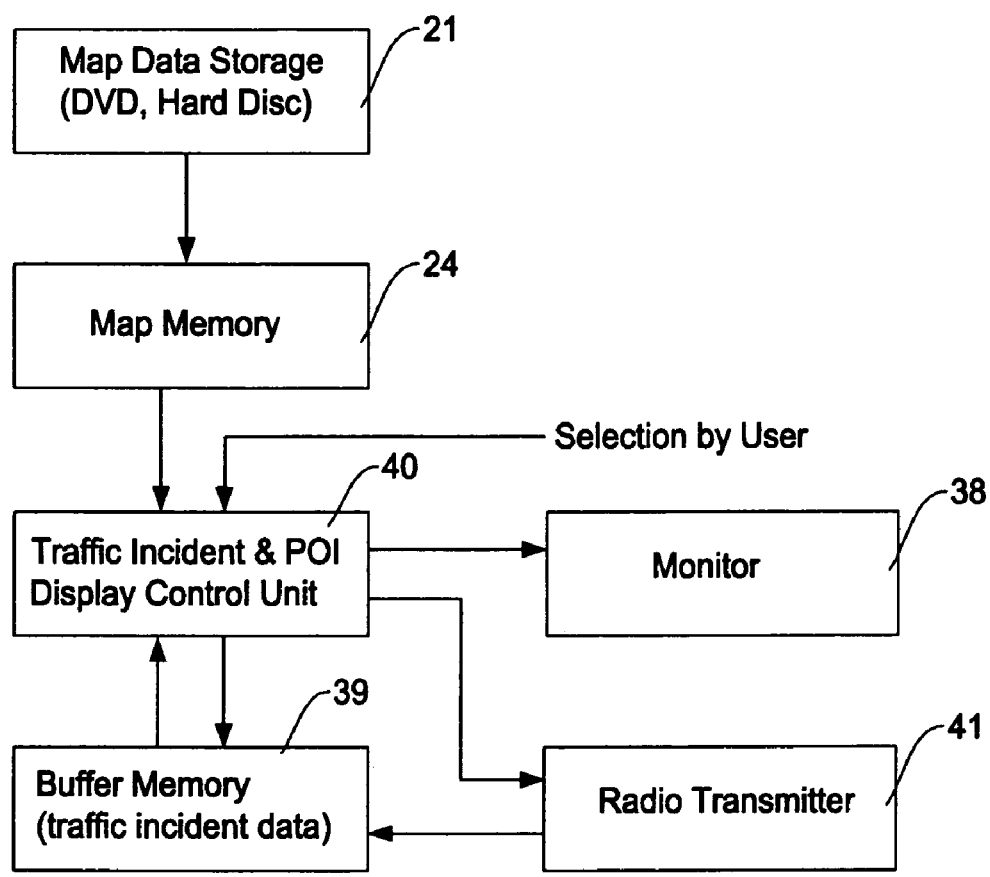
FIG. 3 is a block diagram showing an example of structure in the vehicle navigation system showing the essential components extracted from the block diagram of FIG. 2 for implementing the present invention.

FIG. 3 is a schematic block diagram showing an example of structure in the navigation system for implementing the present invention. The block diagram of FIG. 3 shows the essential components extracted from the block diagram of FIG. 2 that are directly related for implementing the present invention. As noted above, the navigation system retrieves the traffic data from the traffic information server and superimposes icons showing the traffic incident on the map image along the route to the destination. As will be described in detail later, the traffic incident icons are arranged for each distance range of the calculated route to the destination.

The block diagram of FIG. 3 includes a map data storage 21, a map memory 24, a display control unit (traffic incident and POI display control unit) 40, a buffer memory 39, a radio transmitter 41, and a monitor 38, all of which are also shown in the block diagram of FIG. 2. The display control unit 40 can be a part of the CPU 29 in FIG. 2. The buffer memory 39 can be a part of the RAM 31. An example of the radio transmitter 41 includes a Bluetooth transmitter (transceiver), an IEEE 802.11b wireless LAN transmitter, and a HomeRF transmitter.

The map data storage 21 stores map data which is the data base of the navigation system. The map data storage 21 is a DVD, CD-ROM, hard disc or any other storage medium that can store a large volume of map data. In the case where the navigation system is established in combination with a remote server through a communication network such as Internet, such map data can be provided to the user from a map data storage in the remote server. Under the control of the CPU 29 (FIG. 2), the map data is extracted from the map data storage 21 and is sent to the map information memory 24 so that the display control unit 40 can access the data.

The display control unit 40 receives the data indicating the route to the destination from the CPU 29 and the map data from the map memory 24. The display control unit 40 also receives the traffic incident data from buffer memory 39 retrieved from the traffic information server. The display control unit 40 examines the map data, the route data, and the traffic incident data and produces a list of traffic incidents classified into distance ranges along the route. In another aspect, the display control unit 40 produces a list of POIs classified into the distance ranges. Such a list is displayed on the monitor 38.

The user selects one or more items (traffic incidents or POIs) from the list to be removed from the route to the destination. Upon receiving the request from the user regarding the selection of the items to be removed, the display control unit 40 sends the request to the CPU 29 for recalculation of the route to the destination. The CPU 29 calculates and modifies the route to the destination either by recalculating the whole route or only the distance range that includes the selected items. The resultant new route is sent to the display control unit 40 which causes to display the new list on the monitor 38.

As noted above, through the wireless communication capability shown in FIGS. 1–3, the navigation system receives traffic data from the traffic information server. The obtained traffic data is displayed to warn the user about possible obstructions and delays in his travel. An example of traffic data is shown in FIG. 4A which lists the types of traffic incidents by icons or symbols. Different colors may also be used to show degrees of seriousness of the traffic incidents. In the example of FIG. 4A, icons are provided to help the user in identifying the natures of the traffic incidents.

FIG. 4B shows examples of traffic incident icons in enlarged view. A stalled vehicle icon (symbol) 81 indicates that one stalled vehicle is reported. An accident icon 83 indicates that one or more vehicles are involved in a traffic collision accident. A construction icon 85 indicates a traffic construction in progress. Although only three symbols are shown, many other icons, such as one indicating debris on the street, road closure, traffic jam, fire, police stop, etc. may be used as well.

Figure 5:
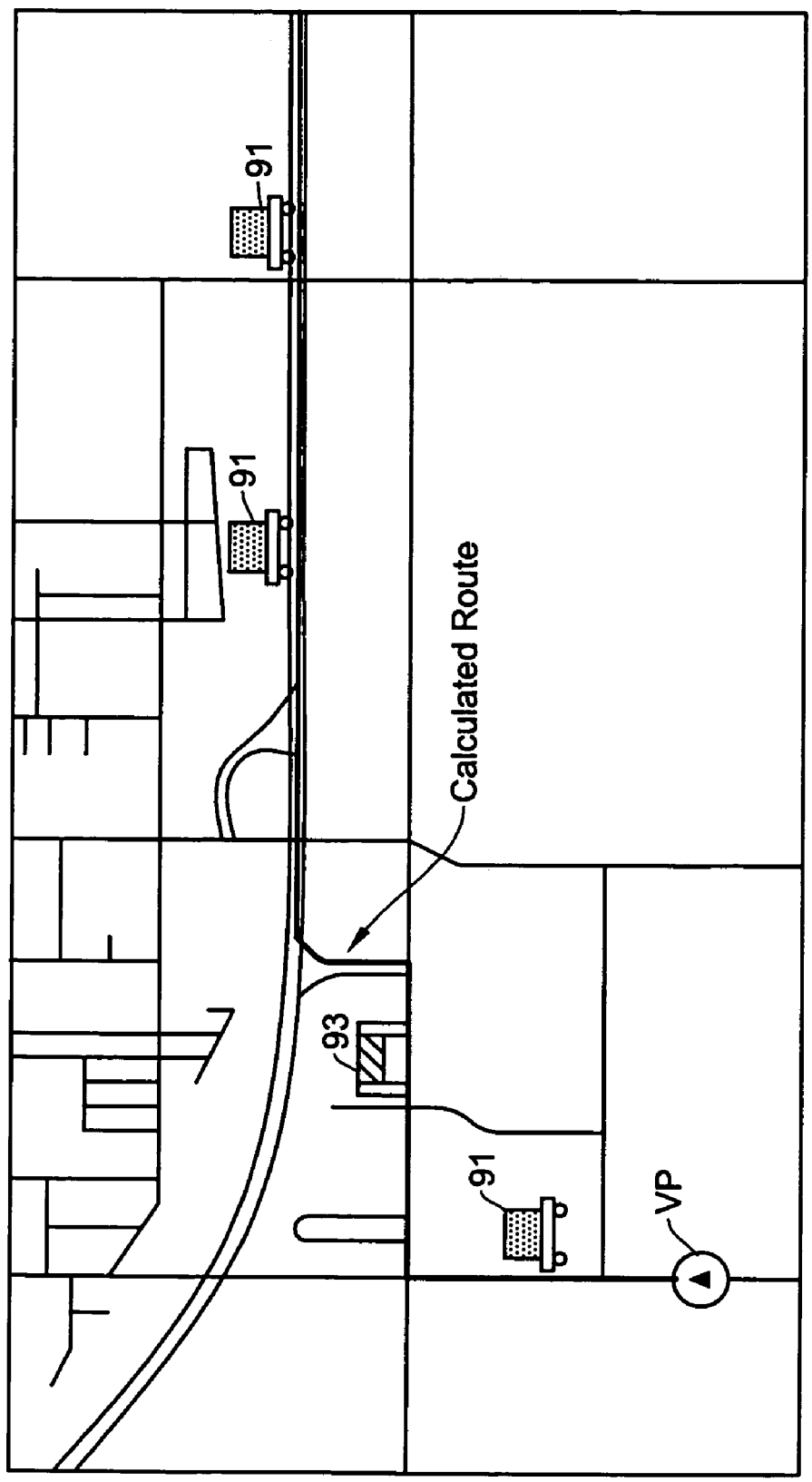
FIG. 5 is a map image displayed on the navigation system showing a route to a destination with traffic incident icons along the route on the map image.

Another example of displaying the traffic data is shown in FIG. 5. In the example of FIG. 5, stalled vehicle icons and a construction icon are shown on the map image on the screen. The map image includes a calculated route (solid line) to the destination produced by the navigation system on which the current user position is indicated by a label VP (vehicle position). Three stalled vehicle incidents are indicated on the map by the reference numeral 91, and one road construction incident is indicated by the reference numeral 93. The location of the traffic incident icons on the map corresponds to the actual locations of the traffic incidents as reported by the traffic information server.

The screen example of FIG. 5 is created when the user sets the destination so that the navigation system calculates a route to the destination through a shortest distance method, shortest time method, etc. Through the radio communication, the navigation system retrieves the traffic information from the remote server which is combined with the calculated route to the destination. Thus, the navigation system is able to display the traffic incident icons along the calculated route.

Based on the information shown on the screen, the user may want to alter the route by selecting which traffic incidents should be avoided. For instance, the user may think that because the stalled vehicle is a temporary problem, this type of the problem can be ignored in calculating the new route. However, the user may think that the road construction may take a long time before being cleared, thus he wants to avoid the road construction from the newly calculated route.

The distance from the present vehicle position to the location of the traffic incident is relevant in determining which traffic incident is to be avoided for a recalculation purpose. For instance, if the traffic incident is located within 5 miles from the present location, the user may wish to avoid traffic collision type incident because it is less likely that the problem is solved by the time the user reaches that particular spot. The longer the distance to the location of the traffic incident from the current position, the more likely that the problem is resolved by the time the user reaches the location.

Thus, in a case where there is a traffic accident in the range of 15 to 20 miles, the user may proceed to the route on the belief that the problem associated with the traffic accident will be eliminated or greatly diminished when the user reaches there. On the other hand, the user may wish to avoid the road construction because it is not certain when the construction ends. Thus, by allowing the user to decide which conditions are to be avoided, the navigation system contributes to efficient driving by the user. Moreover, the user will get the sense of control because he can exert more discretion in determining which route to take.

The present invention provides various aspects of avoiding or limiting a particular type of traffic incident, traffic maneuver, or POI. FIGS. 6A–6F show an example of process and screen display of the navigation system when the user selects to avoid a certain type of maneuver on the route to the destination. FIG. 6A shows the display where the user confirms the destination. In FIG. 6B, the navigation system calculates an optimum route to the destination. The progress of calculation can be indicated by the bar indicator at the bottom in the display of FIG. 6B.

After the route is produced, the navigation system moves to a route guidance mode, such as an intersection guidance as shown in FIG. 6C, so that the user can follow the calculated direction. If the user wants to remove a particular traffic incident or maneuver, etc., he activates the "Select List" key at the upper right of the screen in FIG. 6C. Consequently, the navigation system displays a "Select Type" screen as shown in FIG. 6D which prompts the user to select the type of items to be modified. In the example of FIG. 6D, the "Select Type" screen shows four types; "Traffic Incident Type", "Maneuver Type", "POI Along the Route", and "POI Along the Route by Exit" for the user to select one of them.

In the case where the user selects "Maneuver Type", the navigation system displays a list of maneuver types as shown in FIG. 6E. Thus, the user is able to select a particular maneuver in the list to be avoided from the new route to the destination. In this example, the user selects the first left turn maneuver to be removed from the route. In FIG. 6F, the navigation system recalculates the route that reflects the user's instruction.

As shown in FIG. 6G, based on the new route produced in the above procedure, the navigation system guides the user to the destination without using the particular maneuver (left turn) specified in the list of FIG. 6E. The process similar to the above is performed when the user selects the other types of items, such as traffic incidents or POIs in the process of FIGS. 6A and 6E. As will be explained in more detail later, the recalculation process can be performed in a shorter period of time than the calculation process in the first route calculation.

Figure 7:
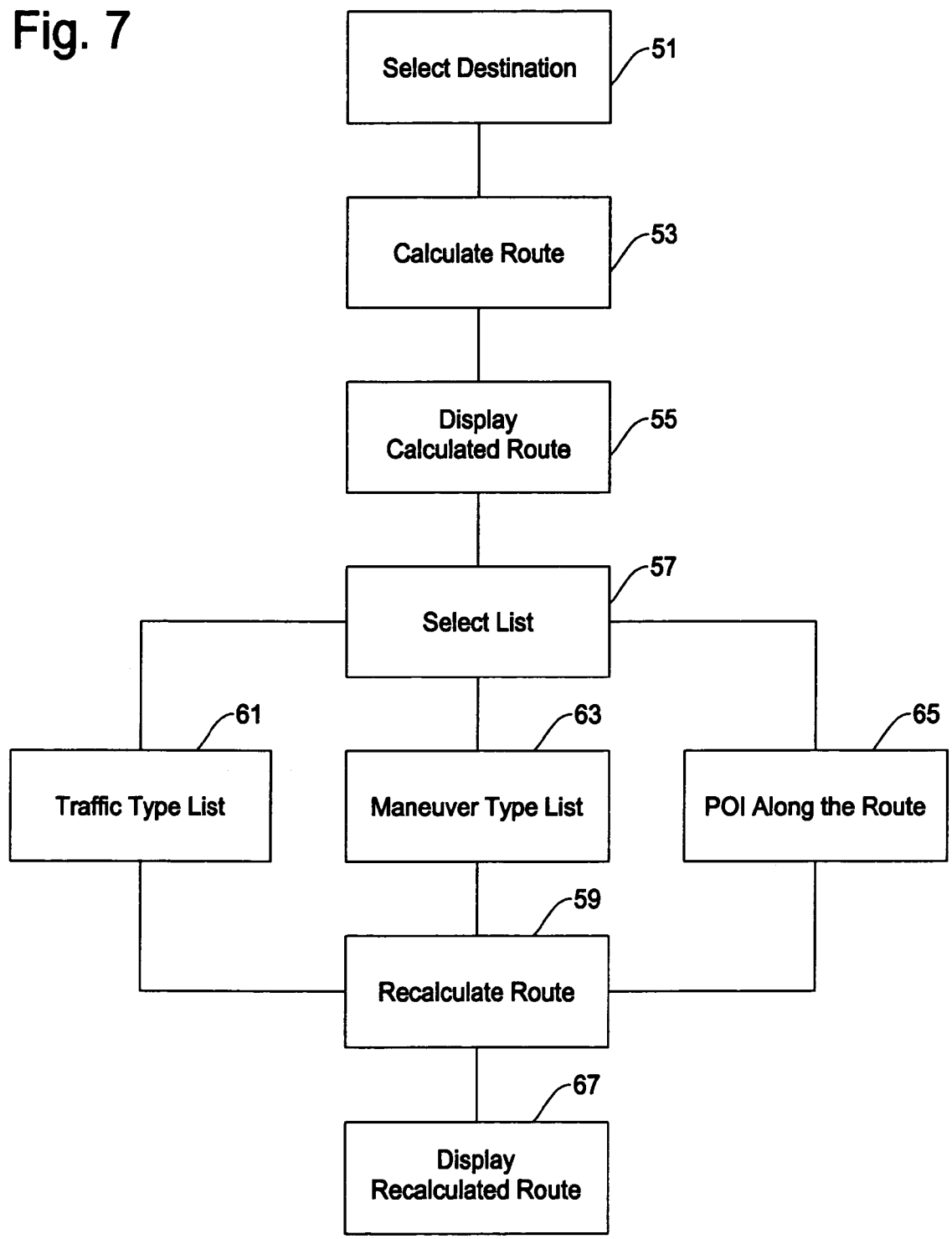
FIG. 7 is a flow chart showing an example of operational flow in the navigation system of the present invention for selecting the destination, changing the type of traffic data to be modified, and recalculating for determining the new route.

FIG. 7 is a flow chart showing the basic process by which the present invention is performed. In step 51, the user selects the destination. When the user inputs the destination, the navigation system calculates an optimum route to that destination in step 53. For example, the route is determined based on the shortest way to reach the destination, the shortest time to reach the destination, the route preferring freeways to surface roads, the least expensive way to the destination, the route without using toll road, or the like. After the calculation is performed, the navigation system displays the calculated route on the screen in step 55.

At step 57, the user select one or more lists to modify the route or to modify the manner of displaying the POIs. For example, the user may press the "Select List" button in FIG. 6C to select a list of types of items. As shown in FIG. 6D, the navigation system displays a list of types of items, such as "Traffic Incident Type", "Maneuver Type", "POI Along the Route", and "POI Along the Route by Exit" to prompt the user to select one of them. In response to the type selected by the user, the process branches off to several list categories.

For example, in FIG. 7, the process moves to display a "Traffic Type List" screen in step 61, a "Maneuver Type List" screen in step 63, or a "POI Along the Route" screen in step 65. Although only three types of list are provided in FIG. 7, other lists of types may be also provided. For example, "POI Along the Route" may be divided into a classification by distance ranges or exists of freeway as shown in FIG. 6D.

As shown in the flow chart of FIG. 7, after the user selects an item such as a particular traffic incident from the list of several traffic incidents, the navigation system recalculates the route in step 59, and displays the resultant new route in step 67. In selecting particular data, it is also possible for the user to select two or more items all at once by choosing several icons and pressing an OK button. For example, on the screen of FIG. 6E, the user may select two or more maneuvers from the "Maneuver Type List" and press the OK button to effectuate the selection.

Figure 8:
FIG. 8 is an example of display on the screen of the navigation system of the present invention showing a traffic incident type list arranged in the order of distance from the current user position.
Figure 10:
FIG. 10 is an example of display on the screen of the navigation system of the present invention in which the collision type incident selected in FIG. 9 is eliminated from the 0–5 mile rage in the list.

In order for the user to perform the operation described above, the navigation system provides a proper means for displaying the types of traffic incidents or other items and selecting a particular item. FIGS. 8–10 show an example of process and screen display for listing the types of traffic incident, selecting a particular traffic incident, and removing the traffic incident along the route. In the example of FIGS. 8–10, the types of traffic incidents are arranged on the display per distance range along the calculated route to the destination.

FIG. 8 shows an example of display listing the traffic incidents along the originally calculated route to the destination. As noted above, such traffic incident information can be retrieved from the remote traffic data server through the wireless communication. This display will be shown when the user elects "Traffic Incident Type" from the list shown in FIG. 6D. In the flow chart of FIG. 7, this process is represented by the steps 61, 59, and 67. In this example, the calculated route is divided by every five miles where traffic incidents within each distance range are listed in that order. The process to obtain the display in FIG. 8 may be achieved by any means at any time during the route guidance mode of the navigation system. For instance, the user may call the traffic incident type list screen by pressing an appropriate key, or by pressing a touch screen, or by a voice command.

The types of traffic incident are represented by symbols (icons) or short notes to help the user to quickly perceive and recognize the types of traffic incident. Each traffic incident icon represents one traffic incident. The traffic incident icons in each distance range are listed in the order of distance from the current vehicle position, i.e., in the order that the user will encounter them when driving along the calculated route.

For example, in the 0–5 mile range shown on the first row, the traffic incident of stalled vehicle comes first along the route, the road construction comes next, then the collision accident, and lastly, the lane closure. The next row indicates that the incidents are within the range of 5 to 10 miles from the present vehicle position in which there are three traffic incidents, i.e., a traffic construction and two stalled vehicle incidents in this order. Thus, the user can easily grasp the basic idea as to how many, what kind, and how far the traffic incidents are located and plan the travel accordingly.

Next, the operation by the user to avoid a type of traffic incident is explained. As shown in FIG. 9, the traffic accident icon from the range of 0–5 miles is selected. The user wants to avoid the collision type of incident represented by an icon 85 in the 0–5 mile range. Thus, the user selects the icon 85 on the screen which is highlighted in FIG. 9.

After the user has made the selection, the navigation system calculates a new route that will avoid the collision type incident in the original route. FIG. 10 shows the traffic incidents along the new route to the destination where the selected traffic incident in the original 0–5 mile range is eliminated from the list. Since the remaining traffic incidents are the same as those shown in the original list of FIG. 8, it is presumable that the new route includes new waypoints that can avoid the collision in the 0–5 mile range, but all the other waypoints are the same as those in the original route.

In the above example, because the calculation is performed only for the 0–5 mile range, the other ranges in the original route are not affected. Thus, even though the collision type of traffic incident is eliminated in the row for 0–5 mile range, the collision incidents are still present in other rows. The recalculation required to obtain the new route can be minimum because the route to be recalculated is limited to the 0–5 mile range. Thus, the load to the CPU in the navigation system is small and a time for the recalculation is short. The user is less likely to be frustrated in waiting to see the result. Although only the route between 0 to 5 miles is changed in this example, it is also possible to configure the navigation system to recalculate the whole route again.

Figure 12:
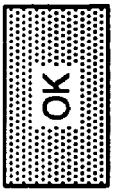
FIG. 12 is an example of display on the screen of the navigation system of the present invention corresponding to the traffic incident type list of FIG. 11 where the right turn maneuver in the 10–15 mile range is selected.

Next, with reference to FIGS. 11–13, the description will be made for the case where the navigation system of the present invention is used when the user wants to avoid a particular maneuver. In this setting, the user selects a destination and the navigation system calculates the route to the destination. The navigation system lists the maneuvers that the user will encounter along the route. This display will be shown when the user selects "Maneuver Type" in the "Select Type" screen of FIG. 6D after the calculated route is established. In the flow chart of FIG. 7, this process is represented by the steps 63, 59, and 67.

FIG. 11 shows an example of screen of the navigation system where the icons of maneuvers along the route are listed in each row of distance range. The first row of the maneuver icons indicates that the maneuvers are within the distance range of 0–5 miles from the present user location. The next row indicates that the maneuvers are within the range of 5–10 miles from the present location, and so on. Thus, the user can tell how far the maneuver is located and plan the trip accordingly.

The maneuver icons are displayed in the order that the user will encounter them when driving along the calculated route. Thus, in the row of 0–5 mile range, the icons indicate that the user will first encounter a right turn, then a U-turn, and then a branch off maneuver. Each icon indicates one maneuver along the route. However, it is also possible to set the navigation system to combine all maneuvers in the same category into one symbol. In such a case one symbol for right turn, for example, may represent a multiplicity of right turns.

The operation for the user to eliminate one type of traffic maneuver from the calculated route is explained with reference to FIG. 12. As shown in FIG. 12, the user wants to remove the right turn maneuver in the 10–15 mile range from the route. Such a case may arise, for example, when the user knows that by making a right turn at that point, he will enter into a bumpy road or a dangerous area. Thus, the user selects the icon 86 in the 10–15 mile range and hits an OK key as shown in FIG. 12.

After the user has made the selection, the navigation system calculates a new route that will avoid the right turn maneuver in the 10–15 mile range on the route. FIG. 13 shows a resultant screen which lists the maneuvers along the new route to the destination. The right turn maneuver in the 10–15 mile range is removed from the list, i.e., the new route avoids the specified maneuver.

Next, with reference to FIGS. 14–15, the description will be made for the case where the navigation system of the present invention is used when the user wants to avoid a particular type of POI (point of interest) from the list. In this setting, the user sets a destination so that the navigation system calculates the route to the destination. As consequence, as shown in FIG. 14, the navigation system lists the types of POIs that the user will encounter when driving along the route to the destination. This screen will be displayed when the user selects "POI Along the Route" in the "Select Type" screen of FIG. 6D after the calculated route is established. In the flow chart of FIG. 7, this process is represented by the steps 63, 59, and 67.

In the example of FIG. 14, the navigation system displays icons of POI types or names of POI types along the route to the destination. The distance ranges from the current vehicle position are allocated to the corresponding rows on the screen. In the first row, the icons indicate the types of points of interest (POIs) located along the route within the distance range of 0 to 5 miles from the current vehicle location. The next row indicates that the types of POIs are within the range of 5 to 10 miles from the current location, and so on.

Generally, the map database (such as DVD 21 in FIGS. 2 and 3) includes a large number of POIs such as one million, which are classified by layers of categories. For example, a category "restaurant" has sub-categories indicating the food types such as "French", "Japanese", "Italian", "Chinese", etc., and each food type has names of restaurant. Thus, in driving a crowded area such as downtown, there may be many POIs along the route. Thus, the number of categories listed on the POI "Along the Route List" can be enormous, which has to be displayed by many pages of screen. In other words, although the example of FIGS. 14–16 list only several POIs in each distance range, in an actual application, several tens or more POIs will be listed in each distance range. When the driver has to scroll the screen many times, it seriously distracts the attention from the safe driving.

In almost all occasions, the user are not necessarily interested in all categories of POIs. If the user is driving a car for a long trip after having lunch, he may not be interested in "Food" category but may be interested in "Gas" station category or "Rest Area" category. In that case, the "Food" category which typically includes a large number of POIs, can be frustrating to the user because many food POIs (ex, restaurants) will be displayed. The present invention provides means so that the user can safely eliminate the unwanted category of POIs from the list.

The operation by the user to eliminate one or more types of POI is explained with reference to FIG. 15. In the example of FIG. 15, the user selects a "Rest Area" icon 97 and a "Shopping" icon 98 in the 0–5 mile distance range to be removed therefrom. If his selection is correct, the user presses the OK key so that the navigation system processes the instruction by the user.

FIG. 16 shows the display after the user has selected "Rest Area" and "Shopping" to be deleted from the list. As shown in FIG. 16, the selected POI categories in the 0–5 miles range are eliminated. In this example, only the selected categories in the selected distance range 0–5 mile range are eliminated. However, it is also possible to eliminate the selected categories from all of the distance ranges on the route to the destination. The user can eliminate as many categories as he wants to obtain a tidy view on the screen.

In the above example, the POI categories are arranged in each row on the screen representing the distance from the current position. The POI data may also be arranged by other parameters, such as exits of a street, typically a freeway. FIG. 17 shows such an example in which the types of POI are listed for each row that is assigned to a corresponding exit of the street. For example, an "Exit 1A" row lists "Food" and "Gas" categories of POIs, and an "Exit 3B" row lists "Gas", "Rest Area" and "Food" categories of POIs, and so on. This configuration can be particularly beneficial when the route to the destination includes a freeway in which the POIs are sorted by the exit of the freeway.

The order of exits on the screen is preferably the same order that the user will encounter when driving along the freeway to the destination. If a certain exit does not have any POI, the navigation system either does not show a row for such exit or does show the row without POIs. The operation of this example is practically identical to the prior example in which POI types are listed according to the distance ranges. Thus, when a user selects a particular category of POIs to remove from the list, the selected category is eliminated from the list.

As described above, according to the present invention, the navigation system is capable of displaying predefined items such as the traffic incidents in the manner that the user can grasp the traffic incidents quickly and easily by one or two short glances at the screen. The user can select the traffic incidents, certain maneuvers, or certain POIs to avoid. Then, the navigation system produces a new calculated route to the destination which does not include the item such as traffic incidents specified by the user. Accordingly, the user can use his discretion in obtaining a new calculated route to the destination. Because the recalculation of the new route requires to perform recalculation for only a part of the route, the load factor to the processor will be minimized. The user can avoid frustration in waiting to obtain the new calculated route because the time required to obtain the new route can be short due to limitation on the range.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A method for a navigation system to modify a calculated route to a destination, comprising the following steps of:
   displaying a set of items that a user will encounter when the user follows the calculated route;
   prompting the user to select a type of the items to be avoided in a new route to the destination; and
   recalculating the new route according to the user's selection and guiding the user to the destination through the new route;
   wherein the navigation system displays the set of items which is classified into distance ranges each representing a range of distance from a current user position, and wherein the type of each item is represented by a corresponding icon within the corresponding distance range.

2. A method for a navigation system as defined in claim 1, wherein the items within the corresponding distance range are displayed in the order of distance from the current position of the user.

3. A method for a navigation system as defined in claim 1, wherein the navigation system creates the new route by calculating a portion of the route corresponding to the distance range that has contained the item selected by the user.

4. A method for a navigation system as defined in claim 1, wherein the navigation system creates the new route by recalculating the whole route including the distance range that has contained the item selected by the user.

5. A method for a navigation system as defined in claim 1, wherein the types of items displayed are traffic incidents along the calculated route, and the method further comprising the steps of:
   receiving traffic incident information through a wireless communication;
   relating the traffic incident information with locations along the route to the destination; and
   displaying the icons representing types of the traffic incidents, thereby prompting the user to select the type of traffic incident to be avoided from the route.

6. A method for a navigation system as defined in claim 1, wherein the items from which the user makes the selection are traffic maneuvers indicating types of turn at intersections.

7. A navigation system to modify a calculated route to a destination, comprising:
   means for displaying a set of items that a user will encounter when the user follows the calculated route;
   means for prompting the user to select a type of the items to be avoided in a new route to the destination; and
   means for recalculating the new route according to the user's selection and guiding the user to the destination through the new route;
   wherein the navigation system displays the set of items which is classified into distance ranges each representing a range of distance from a current user position, and wherein the type of each item is represented by a corresponding icon within the corresponding distance range.

8. A navigation system as defined in claim 7, wherein the items within the corresponding distance range are displayed in the order of distance from the current position of the user.

9. A navigation system as defined in claim 7, wherein the navigation system creates the new route by calculating a portion of the route corresponding to the distance range that has contained the item selected by the user.

10. A navigation system as defined in claim 7, wherein the navigation system creates the new route by recalculating the whole route including the distance range that has contained the item selected by the user.

11. A navigation system as defined in claim 7, wherein the types of items displayed are traffic incidents along the calculated route, and the navigation system further comprising:
   means for receiving traffic incident information through a wireless communication;

means for relating the traffic incident information with locations along the route to the destination; and means for displaying icons representing types of the traffic incidents, thereby prompting the user to select the type of traffic incident to be avoided from the route.

12. A navigation system as defined in claim 7, wherein the items from which the user makes the selection are traffic maneuvers indicating types of turn at intersections.

* * * * *